M. C. HUTCHINSON.
YIELD POINT DETECTOR.
APPLICATION FILED FEB. 26, 1919.

1,428,637.

Patented Sept. 12, 1922.

INVENTOR
Morton C. Hutchinson.
BY
Niedersheim Fambauks
ATTORNEYS.

Patented Sept. 12, 1922.

1,428,637

UNITED STATES PATENT OFFICE.

MORTON C. HUTCHINSON, OF WOODBURY, NEW JERSEY, ASSIGNOR OF ONE-HALF TO LEON G. BUCKWALTER, OF MERCHANTVILLE, NEW JERSEY.

YIELD-POINT DETECTOR.

Application filed February 26, 1919. Serial No. 279,368.

*To all whom it may concern:*

Be it known that I, MORTON C. HUTCHINSON, a citizen of the United States, residing in the city of Woodbury, county of Gloucester, State of New Jersey, have invented a new and useful Yield-Point Detector, of which the following is a specification.

The object of my invention is to determine automatically without the liability of the error of the human equation, the yield point or elastic limit of any specimen under tensile test, and to such end my invention comprehends a novel device by the use of which in its operative application, a single operator may operate a standard testing machine, such, for instance, as the Riehle, Olsen, or the like to which my device is applied, without the assistance of another operator, and in the operation be enabled to watch the specimen being tested and so ocularly determine the point of elastic limit.

With the foregoing and other objects in view, my invention comprehends a novel method of testing and a novel construction of a yield point detector which is applied directly to the specimen to be tested, and is automatic in its action, a typical and preferred embodiment of which is represented in the accompanying drawings and hereinafter described, the particular subject-matter which I claim as novel being particularly set forth in the claims.

For the purpose of illustrating my invention, I have shown in the accompanying drawings one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Fig. 4 represents a side elevation of a specimen to be tested, having therein the notches to which my detector is applied.

Similar numerals of reference indicate corresponding parts in the figures.

Referring to the drawings:—

Figure 1:
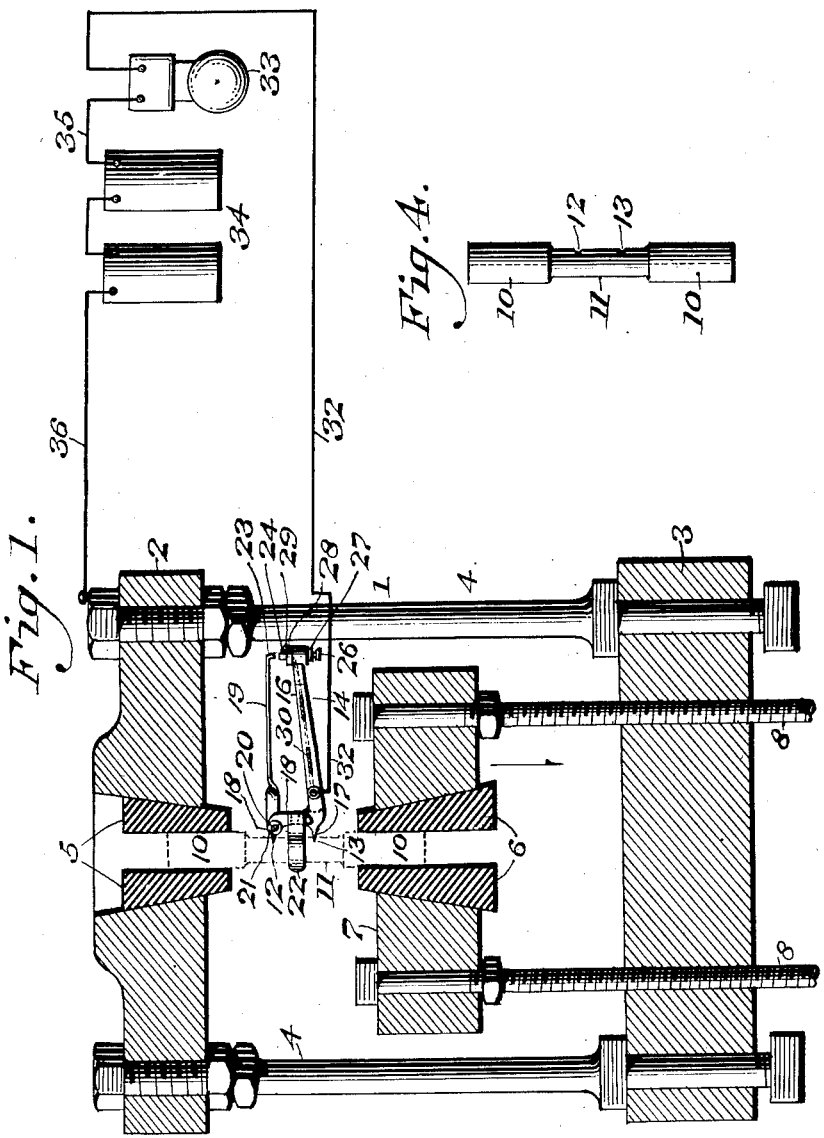
Figure 1 represents a diagrammatic view partly in section, of a typical testing machine and a specimen to be tested therein, showing the manner of applying my novel yield point detector thereto.

1 designates the frame of a typical testing machine of the type, for instance, of the Olsen, Riehle, or the like, 2 and 3 designate respectively upper and lower transverse bars connected, supported and braced by vertical uprights 4 applied in the manner illustrated or in any other preferred way.

The upper transverse bar 2 has a conical aperture within which are introduced a pair of clamping jaws 5 of the type usual in these machines.

Between the upper and lower bars 2 and 3, is located the movable cross-head 7 within which and in alignment below the aperture in the upper bar, is a reversely disposed conical aperture into which are introduced a pair of jaws 6 oppositely correspondent to the jaws 5.

The cross-head being mounted upon vertical rods 8 is capable of up and down movement by any suitable means and is adapted to be adjusted to the desired distance below the upper transverse bar 2, and as the means for making this initial adjustment and for subsequently imparting a downward pull to stretch the specimen to be tested, form no part of my invention, a detailed description thereof is unnecessary.

A typical specimen to be tested, which I have represented in Figure 4 and in dotted lines in Figure 1, whatever its material may be, is customarily formed as shown in Figure 4, being provided with two cylindrical heads 10—10 of uniform length and diameter and with an intermediate neck 11 of lesser diameter and indented with two center punch marks or notches, which I have termed the upper notch 12 and the lower notch 13, which in practice are about two inches apart longitudinally and are adapted to be engaged with the points or spurs 17 and 18 of my novel yield point detector hereinafter described.

In the application of the specimen to the testing machine, the heads 10 are introduced respectively within the jaws 5 and 6, and these jaws are clamped together upon the heads by any conventional means usual in these machines and unnecessary to describe. The specimen having been clamped within the testing machine, and the detector applied to the specimen I effect the test of the latter in the novel manner, which I will describe in connection with the description of the detector itself.

Figure 2:
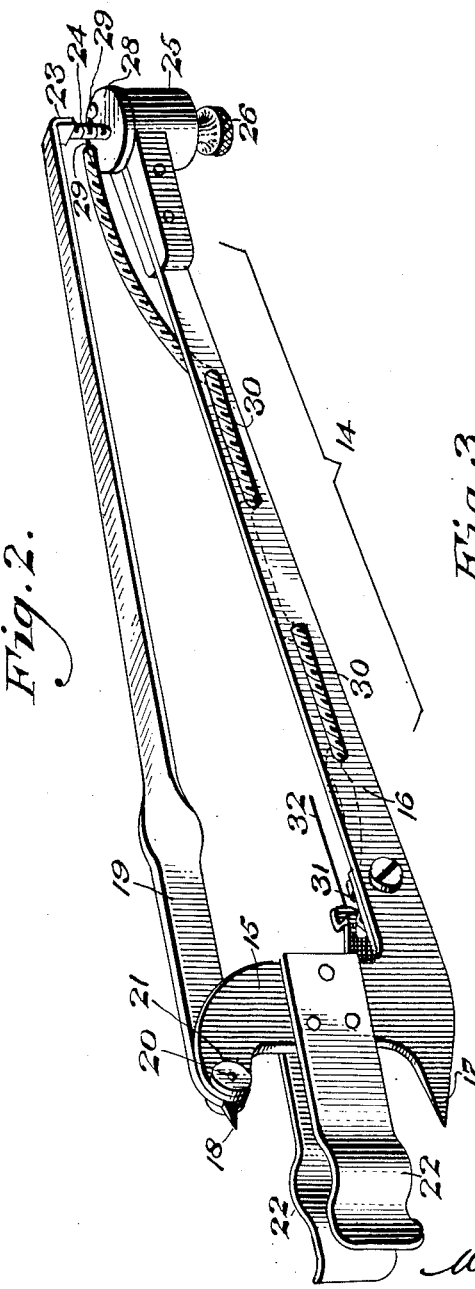
Fig. 2 represents on an enlarged scale a perspective view of my detector in detached position.
Figure 3:
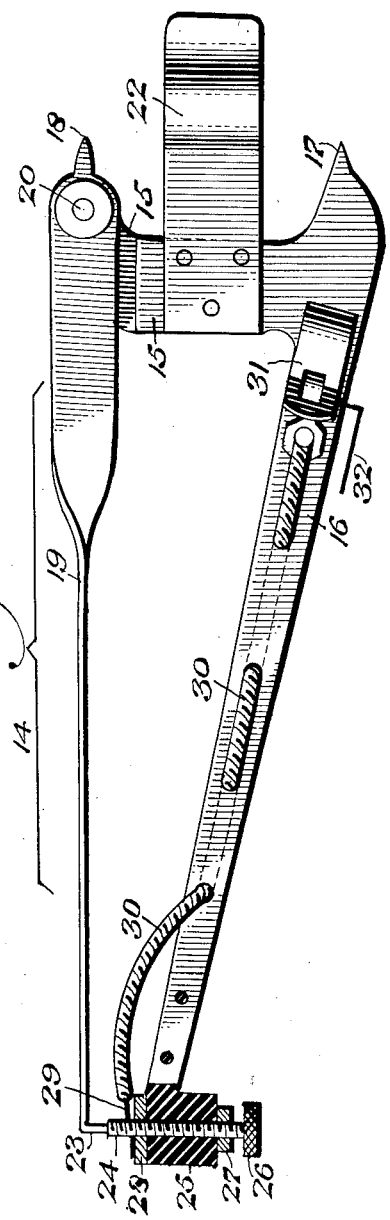
Fig. 3 represents a side elevation of the detector illustrated in Fig. 2, but viewed from the opposite side, a portion thereof being shown in section.

Referring now to Figures 2 and 3,—14 designates my detector as an entirety, which is composed of two arms, a stationary or fixed arm 16 having an upward extension 15 and the spur or pointed end 17 and a movable arm 19, which is pivoted upon said upward extension of the fixed arm which is preferably integral with the fixed arm 16 and carries the fulcrum 20 for said movable arm. To the extension 15 are connected the clamps 22, which are a pair of flat plate springs formed into a loop readily attachable to the neck 11 of the specimen, to clamp the detector as a whole upon the specimen to be tested.

The movable arm 19 has the spur 18 and is fulcrumed at 20, between opposite plates 21, upon the extension 15. The spurs 17 and 18 are preferably ground hardened points like the point of a center punch,—and are preferably spaced a distance apart nearly correspondent to the distance between the upper and the lower notches 12 and 13 on the specimen to be tested.

When my novel detector through its clamps 22 has been clamped upon the neck 11 of the specimen, the two points 18 and 17 will enter and engage respectively within the notches 12 and 13 and be retained therein by the action of said clamps.

The lengths of the arms 16 and 19 are relatively the same, and the fixed arm 16 carries at its outer end an insulated bushing 25, through which passes a metal screw 24, adjustable by a thumb nut 26, adapted to be locked by a lock nut 27 and provided with a terminal plate 28, which in the usual way serves to effect electrical connection between the outer end of an insulated conductor 30, which passes along the fixed arm 16 to its inner end and there terminates in a clip, or standard terminal, 31 by means of which connection is conveniently effected with a wire 32, which, as shown in Figure 1, connects with a bell or other signal 33, which through a suitable connection 35 connects a dry battery or batteries 34 with a line 36, which, for convenience, terminates in a vertical upright 4 of the press and is thereby grounded.

The outer end of the movable arm 19 has the deflected terminal or contact point 23, in line, and adapted to make electrical contact, with the point of the screw 24, as best seen in Figures 2 and 3, in which the parts are represented in the positions they occupy when the circuit is closed.

The movable arm 19 being fulcrumed to the connecting member 15, as already explained, is of course free to swing upon its fulcrum so that its outer end may either be raised or lowered.

After the detector has been applied to the specimen and its points 17 and 18 engage with the notches 13 and 12, all as illustrated in Figure 1, the normal position of the movable arm 19 will be that represented in said figure, that is to say with its contact point 23 out of contact with the screw 24 and the circuit opened.

The points 17 and 18 lie in about the same plane, and the ratio of the lever lengths from point 18 to fulcrum 20 as one lever length, and from the fulcrum 20 to contact screw 24 as the other length, should be about 8 to 1,—so that, obviously, any increase or decrease in the distance between the two points 17 and 18 will be magnified at the outer ends of the two arms.

Having now described the essential elements of the organization which my detector comprehends, its operation in connection with any testing press to which it may be applied will be easily understood.

The specimen having been placed in the testing machine, the detector is sprung into place and clamped upon it, the points 17 and 18 engaging with the notches 13 and 12. The contact screw 24 is then adjusted, so as to be separated from the contact 23 of about one sixteenth ($\frac{1}{16}$) of an inch.

In such position of the parts, and as represented in Figure 1, the cross-head 7 is caused to move downwardly, the operation of my detector will necesarily be such that when the specimen stretches or has reached the elastic limit, the notches or center punch marks 12 and 13 will suddenly begin to separate at a faster rate than before. This marks the point of elastic limit, and at that point, the outer end of the movable arm 19 will assume the position seen in Figures 2 and 3, thereby closing the circuit between the contact points 23 and 24, with the result that the bell or other signal will be sounded and thus audibly announce the determination of the elastic limit, which may be recorded in any conventional way.

By my novel method and apparatus which is automatic in its action, a single operator may operate a standard tension testing machine without the need of another operator to watch the specimen in order to determine the point of elastic limit. I am the first in the art to employ the novel method and device, herein before described, and my claims to these features are to be interpreted with the scope accorded to inventions of this character.

It will now be apparent that I have devised a novel and useful construction of a yield point detector, which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character described, a body portion, an arm carried thereby and provided with a point to engage the specimen to be tested, a second arm pivoted upon the body portion and having a point to engage the specimen, means to hold the device in place while in use, and circuit closing means operated by the pivoted arm.

2. In a device of the character described, an arm provided with a point to engage the specimen to be tested, a coacting arm pivotally connected with the first named arm and having a point to engage the specimen, a clamp connected with one arm and extending forwardly in the direction and in advance of said points to engage the specimen as the points are moved forwardly toward the specimen, and circuit closing means carried by the arm.

3. In a device of the character described, a member having means to engage with the specimen to be tested, a second member arranged near the first named member and movable with relation thereto and having means to engage with the specimen, means to hold the device upon the specimen, and circuit closing means carried by said members.

4. As an article of manufacture, a yield point detector, which comprises a pair of arms pivotally connected at their inner ends and provided with points, adapted to engage the specimen to be tested, a clamping means by which the detector as an entirety may be applied to the specimen to be tested, and opposing electrical contacts at the outer ends of said arms and adapted by a movement of said arms upon their pivotal connection, to be separated or brought together.

5. As an article of manufacture, a yield point detector, comprising a pair of arms pivotally connected at their inner ends and provided with points, electric contacts at the opposite ends of said arms, one of said arms carrying an electric conductor attached at one end to the contact carried thereby, and a clamping means carried by said detector and adapted to engage the specimen to be tested.

6. A yield point detector, which comprises in combination:—a fixed arm, at the inner end of which is a point and at the outer end an adjustable electric contact,—a movable arm, at the inner end of which is a point and at the outer end an electric contact,—a connection between the inner ends of said arms to which said movable arm is fulcrumed beyond said point,—and a laterally extending spring clamping device applied to the connection between said arms, and adapted to engage the specimen to be tested.

7. In a device of the character stated, an arm 16, having at one end the upright member 15 and the point 17, and at its opposite end the insulation 25 and the threaded screw 24 therethrough, a plate 28 engaging said screw, a conductor leading therefrom, a clamping device projecting laterally from said upright member and adapted to engage the specimen to be tested, and an arm 19 pivoted to said upright member 15 and having the point 18 at one end and the terminal 23 at the other end.

8. In an organized machine for testing the tensile strength of a specimen, a yield point detector comprising a pair of arms at their inner ends pivotally connected and provided with points, and at their outer ends provided with electrical contacts,—a clamping means by which the detector is adapted to be applied to and supported upon the specimen to be tested, and an electric circuit including a source of electricity and a signal and connected with the detector,—which circuit when the testing strain in the testing machine upon the specimen to be treated, has, through the separation of said notches and points, occasioned the meeting of said contacts, will be closed to operate said signal and thereby indicate the termination of the elastic limit.

9. In an organized machine for testing the tensile strength of a specimen, a detector which comprises a fixed arm at the inner end of which is a point and at the outer end an adjustable electric contact, a movable arm at the inner end of which is a point and at the outer end an electric contact, and a connection common to the inner ends of said arms to which the movable arm is fulcrumed in advance of its point,—a clamping means by which the detector is adapted to be applied to and supported on said specimen, and an electric circuit including a source of electricity and a signal, a line of which extends from the contact of said fixed arm to said signal and another line of which is grounded,—which circuit when the testing strain in the testing machine upon the specimen to be tested, has, through the separation of said notches occasioned the meeting of said contacts, will be closed to sound the signal and thereby indicate the termination of the elastic limit of said specimen.

10. In a device of the character described, a body portion, clamping means carried by the body portion to engage with the specimen to be tested, a member carried by the body portion and having means to engage with the specimen, a second member carried by the body portion and movable with relation to the first named member and having means to engage with the specimens, and circuit closing means carried by the members.

MORTON C. HUTCHINSON.

Witnesses:
J. W. MEEKER,
JOHN R. HARROP.